United States Patent Office 3,208,994
Patented Sept. 28, 1965

3,208,994
PROCESS FOR PREPARING HYDROPHILIC COPOLYMERIZATION AND PRODUCT OBTAINED THEREBY
Per G. M. Flodin, Perstorp, Sweden, assignor to Aktiebolaget Pharmacia, a company of Sweden
No Drawing. Filed Oct. 23, 1962, Ser. No. 232,597
Claims priority, application Sweden, Oct. 25, 1961, 10,596/61
13 Claims. (Cl. 260—209)

INTRODUCTION

This invention generally pertains to an improved method for the manufacture of certain high molecular weight hydrophilic copolymerizates. (In the following specification and claims the terms "copolymerizate" and "copolymerizates" are intended to mean a product obtained by the chemical combination of a number of similar units to form a single molecule wherein polymerization phenomena as well as condensation reactions may be involved.) More particularly, the present invention relates to the manufacture of certain high molecular weight hydrophilic copolymerizates having a desired grain size.

THE INVENTION BROADLY

The novel method according to the present invention broadly involves the following steps:

(a) Providing a first liquid solution of a hydroxyl group-containing uncharged polymer substance,
(b) Reacting with said hydroxyl polymer substance a bifunctional organic substance capable of reacting with the hydroxyl groups of the uncharged polymer substance with the formation of ether bridges of the R—O—X—O—R wherein R represents the molecules of the dextran substance and X is an aliphatic radical obtained from the bifunctional substance containing 3 to 10 carbon atoms,
(c) Said reaction being carried out in the presence of an alkaline reacting substance,
(d) Said first liquid solution of said hydroxyl polymer substance being admixed, prior to said reaction, with a second liquid medium which is capable of forming a two-phase system therewith,
(e) Agitating said first liquid solution of said hydroxyl polymer substance and said second liquid medium sufficiently to cause the formation of drops containing said hydroxyl polymer substance,
(f) Said drops being maintained at least until gel formation has taken place as the result of the reaction of said hydroxyl polymer with said bifunctional organic substance in the presence of said alkaline reacting substance and
(g) Recovering the gel grains of the copolymerizates formed from said reaction.

OBJECTS

A primary object of this invention is to provide a process for the direct manufacture of the above-identified copolymerizates so that no disintegration of the reaction product is necessary. Other objects and advantages will become apparent after reading the following description and claims.

THE HYDROXYL GROUP-CONTAINING UNCHARGED POLYMER SUBSTANCE

Examples of suitable hydroxyl group-containing uncharged polymer substances for the method of this invention may be mentioned polysaccharides (such as dextran, starch, dextrin, cellulose, polyglucose) and hydroxyl group-containing uncharged derivatives of these substances (such as methyl dextran, ethyl dextran, hydroxypropyl dextran, methyl cellulose, ethyl cellulose, ethylhydroxyethyl cellulose) or products obtained by a partial depolymerization of the same, as well as fractions thereof, and polyvinylalcohol.

For most polymer substances such as starch, dextran, cellulose and similar substances, water will be the most suitable solvent, but other liquids having similar solubility properties, such as alcohols and ketones, may prove to be desirable under certain circumstances. If desired, solvent mixtures may be used in which water is the main component.

The term "dextran" or "dextran substances" as used in the present specification and in the appended claims are intended to encompass polymers of dextran having an average molecular weight ranging from 1000 up to several millions, or even hundreds of millions and consisting of glucose residues bonded together by mainly alpha-1,6-glycoside linkages. Thus, for example, suitable dextran substances for the reaction of the present invention would include native dextran or partially depolymerized dextran obtained by hydrolysis of native dextran, or hydrophilic hydroxyl group-containing derivatives of dextran, or neutral hydroxyl group-containing hydrophilic derivatives of dextran or partially depolymerized dextran, such as ethyl, hydroxyethyl or 2-hydroxypropyl ethers of dextran, or dextran glycerine glucoside, or hydrodextran (i.e. dextran, the reducing end groups of which have been reduced to alcohol groups). Often fractions of the above-mentioned dextran substances may also advantageously be used.

THE BIFUNCTIONAL ORGANIC SUBSTANCE OR CROSS-LINKING AGENT

The bifunctional organic substances useful in accordance wtih this invention preferably have the general formula X—R—Z wherein R stands for an aliphatic residue, containing 3–10 carbon atoms, and X and Z are halogen or epoxy groups. Examples of suitable bifunctional organic substances useful for the present invention are epichlorohydrin, dichlorohydrin, 1,2,3,4-diepoxybutane, bis-epoxy propyl ether, ethylene glycol-bis-epoxy propyl ether and 1,4-butan-diol-bis-epoxypropyl ether, and closely related compounds.

The aliphatic chains forming the cross-linking bridges of the copolymerizate are accordingly substituted, preferably with hydroxy groups, and/or interrupted by other atoms, preferably oxygen atoms.

THE ALKALINE REACTING SUBSTANCE

The reaction is carried out in aqueous solution and in the presence of an alkaline reacting substance having a catalyzing effect on the reaction. The alkaline reacting substance required for the reaction is usually contained in the first liquid solution of the hydroxyl group-containing uncharged polymer substance, but it is also possible to supply the alkaline reacting substance dissolved in the second liquid medium (dispersing medium) which forms continuous phase of the two-phase system. There is, however, no reason why the two-phase system cannot be formed first, after which the alkaline reacting substance can be introduced in dissolved form into the two-phase system mixture so as to induce the cross-linking reaction.

In principle, any substance presenting alkaline properties in solution can be used for the reaction. The alkali-metal hydroxides such as sodium hydroxide are, however, the most frequently used alkaline substances. Such substances as quaternary ammonium compounds, the alkali metal and alkaline earth metal carbonates and the alkali earth metal hydroxides may also be used.

It is preferable to use an alkali metal hydroxide as the alkaline reacting substance serving as a catalyst or accepting agent for the hydrogen halide, said alkali metal hydroxide being added to the water or aqueous liquid used for dissolving the uncharged polymer to be copolymerized. In many cases the alkali metal hydroxide will facilitate the dissolution of the uncharged polymer in said first liquid solution and increase its solubility. This especially applies with respect to the use of the polymer substances, dextran and starch.

THE SECOND LIQUID MEDIUM (CONTINUOUS PHASE) AND DISPERSION STABILIZERS

As the second liquid medium (the continuous phase of the two-phase system) there may be used liquids which are immiscible with the substance (the first liquid solution) used as a solvent for the hydroxyl group-containing polymer substance. Suitable second liquid medium would include aromatic hydrocarbons, halogenated aliphatic and aromatic hydrocarbons, such as toluene, dichloromethane, 1,2-dichloroethaone and 1,2-dibromoethane, o-dichlorobenzene, ethylenedichloride, when the hydroxyl group-containing polymer substance is dissolved in water.

In order to form stabilized dispersions of the solution of the hydroxyl group-containing uncharged polymer compound it is advisable, according to my invention, to add a dispersion stabilizing agent to the second liquid medium which forms the continuous phase. As suitable stabilizing agents there may be mentioned high molecular weight polymers insoluble in water, such as polyvinylacetate, polystyrene, polyisobutylene and celluloseacetate-butyrate e.g. manufactured under the trade name Cellit BP–900 by the Bayer Co. in Leverkusen, Germany. It has been found that the molecular weight of such high molecular weight polymers determines, to a considerable degree, their action as stabilizing agents, polymers having relatively high average molecular weights being capable of stabilizing the dispersion more effectively than products having lower average molecular weights under equal conditions. It is advisable to base the amount of stabilizing agent on the composition of the second liquid medium which forms the continuous phase, having the bifunctional organic substance dissolved or in which it is dissolved on the formation of the two-phase system. Suitable amounts for the stabilizing agents are within the range of from about 0.1 to 15 percent, preferably in range of from 0.1 to 10 percent (weight/volume).

THE AMOUNT AND CONCENTRATION OF THE REACTANTS

The molecular proportions of the hydroxyl group-containing uncharged polymer substance and the bifunctional organic substance should be 1 to at least 10.

The concentration of the liquid solution of hydroxyl group-containing substance is of great importance because it determines the swellability (water regain) of the final copolymerizate. Using a low concentration of the hydroxyl group-containing uncharged polymer substance will result in a higher swellability of the final product then when a higher concentration thereof is used. With water solutions of dextran the concentration of the dextran can be 5 to 70 percent, by weight, the better results having been obtained while using concentrations of dextran in the range of from 10 to 50 percent, by weight. When substances other than dextran, such as cellulose derivatives, are employed even lower concentrations can be used.

ORDER OF INTRODUCTION OF THE REACTANTS

In order to carry the reaction according to my invention, it is preferable to proceed in such a way that a solution of the alkaline reacting compound and the hydroxyl group-containing uncharged polymer substance is mixed with that liquid which is to serve as the second liquid medium (or continuous phase) of the two-phase system, under sufficient agitation conditions to attain the desired sizes of the suspended drops, whereupon the bifunctional organic substance is introduced into the two-phase system, and if desired, such introduction can be in a stepwise manner. The bifunctional organic substance may, however, also be supplied to the two-phase system dissolved in the second liquid medium serving as the continuous phase.

The above-mentioned sequence of the introduction of the reaction components has proved preferable in practice, but it is also possible to contact a portion of the bifunctional organic substance or the whole amount thereof with the first liquid solution of the uncharged polymer substance before the two-phase system has been formed. In this connection, gel formation has to be prevented from taking place before the two-phase system is formed. This can be attained by maintaining such a mixture at a sufficiently low temperature to cause the reaction to proceed so slowly that the mixing operation can be carried out. The gel formation can also be prevented from taking place by keeping back the alkaline reacting substance, the latter being supplied only after the drop formation has taken place.

REACTION TEMPERATURES AND TIMES

The reaction temperature may be varied within wide limits and as a consequence the reaction time will be dependent to a certain extent on the reaction temperature which has been chosen. With regard to the speed of reaction it is advisable to not work at too low a temperature. However, on the other hand, in order to avoid undesirable side reactions, the temperature should not be too high, and in certain instances it may be desirable to utilize cooling means to control the temperature of the reaction. With due consideration to these circumstances, it is preferred to carry out the reaction at a temperature between about 15° C. and 60 to 90° C., preferably within the range of 30 to 70° C. However, it is conceivable that higher or lower temperatures could be used under certain circumstances.

Depending on the reaction temperature, the reaction medium, the reaction temperature, etc., the formation of a gel copolymerizate usually takes place in a matter of hours, for example, from about 2 to 4 hours, or in some instances even sooner.

OTHER PROCESS VARIABLES

Under certain conditions it will be advisable to add a surface-active agent of the detergent type to the mixture to be reacted. Such surface-active agents do not act as suspension stabilizing agents, but can be used in combination with such agents when it is desirable to attain special effects such as smaller sizes of the copolymerizate obtained. During the first period of the copolymerization process, the conditions of agitation are particularly important, these conditions and the presence of stabilizing agent determining the liquid drop sizes of the dispersed phase. In this connection, the skilled person will be capable, by examining samples taken out from the reacting mixture, at different agitation speeds, to determine the agitation speed necessary to attain a desired result.

It is frequently advisable to add the bifunctional substance to the system only when suitable drop sizes have been attained. The time at which gel formation takes place depends on the content of hydroxyl group-containing uncharged polymer in the dispersed phase, the amount of bifunctional substance, the temperature, etc. The reaction will, however, proceed until the bifunctional substance has been consumed or the reaction is interrupted. After the gel formation has taken place the agitation will be of no or less importance for the particle sizes of the final copolymerizate.

RECOVERY AND TREATMENT OF THE REACTION PRODUCT

It is usually desirable to purify the final product and the easiest method of purification would be filtration or centrifugation with water or organic solvents. It is important that some water be present, since when the gel is in a completely unswollen state it often traps and encloses impurities mechanically, whereas when the gel swells under the influence of water, these impurities can pass out of the gel particles by diffusion.

The stabilizing agent can be removed from the gel grains by treating the gel grains with a suitable solvent. With respect to high molecular weight polymers capable of undergoing hydrolysis under relatively mild conditions, it will be advisable first to treat the gel grains with an hydrolyzing agent, for example, a solution of an alkali metal hydroxide, and then remove the hydrolyzed products by washing the gel grains with a solvent for these products. High molecular weight esters such as polyvinylacetate and cellulose-acetate-butyrate, can be treated with a weak aqueous solution of an alkali metal hydroxide to effect saponification of the esters, after which the high molecular weight alcohols formed can be removed by washing with a suitable solvent.

The gel copolymerizate is preferably subjected to a curing step and although the curing conditions are not critical they are preferably carried out at an elevated temperature within the range of about 30° to 90° C. and for a time generally within the range of 5 to 48 hours, to complete the reaction.

USES OF THE REACTION PRODUCT

Aside from its obvious use as a desiccant, the gel copolymerizates manufactured in accordance with this invention have proved to be extremely valuable for separation of substances of different molecular dimensions by the so-called molecular sieving techniques, for which purpose they may be used in grain sizes having an average diameter within the range of about 0.01 to 2.0 mm. As an example of this use of the gels may be mentioned the separation of solutes of colloids from solutes of crystalloids from a solution. Other purposes of utilization are as disintegrating agents for tablets, as water-keeping laxatives and as fillers in pharmaceutical, rubber, plastic and chemotechnical preparations.

Since the reaction products of the method of this invention are particularly useful for molecular sieving purposes, I have conceived that it would be advantageous to be able to carry out the method so that the size of the gel grains resulting from the method could be used directly in molecular sieving processes without the necessity for subsequent grinding, sieving, etc. This is possible when utilizing the method of my invention.

The present copolymerizates have been tested for molecular sieving purposes and excellent results have been obtained due to the fact that the grains are ball-shaped and accordingly present a lower flow resistance when packed together than columns comprising gel grains of similar copolymerizates obtained by grinding or other disintegration operations. The products of the present invention have proved exceedingly valuable for separating mixtures of sensitive compounds, such as those contained in biological liquids because the time period during which such liquids can be permitted to be exposed to the separating medium is quite limited, and low flow resistance and speed of separation is highly important.

CHEMICAL PROPERTIES OF THE REACTION PRODUCT

As indicated earlier, a preferred copolymerization gel product obtained during my reaction process contains the molecules of the dextran substance bound together by ether bridges which are of the common type

—R—O—X—O—R— wherein R represents the radicals or residues of the molecules of the dextran substance and X is the aliphatic radical from the bifunctional substance. If a bifunctional glycerine derivative is used (for example, epichlorohydrin) the bridge will be of the type

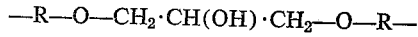

where the radical X contains 3 carbon atoms.

The preferred gels obtained in this way consist of three dimensional networks of macroscopic dimensions of the molecules of the dextran substance, built up of chains of mainly alpha-1,6-glucosidically bonded glucose residues, bonded together by ether bridges of the above-mentioned general type —R—O—X—O—R—, wherein R represents the dextran substances and X is the aliphatic radical in the ether bridge, said aliphatic radical X containing from 3 to 10 carbon atoms.

My preferred gel products are insoluble in water but capable of swelling therein due to the presence of hydroxyl groups. The capacity of swelling of the gel product so obtained may be expressed by the amount of water in grams which can be absorbed by 1 g. of the dry gel, which is referred to as its "water regain." The water regain for the products produced according to the invention may be from about 1 to 50 g./g. of the dry gel product, but is generally within the range of about 1 to 30 g./g. of dry gel product.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature, and the pressure is atmospheric, unless otherwise indicated. The molecular weights ($M_w$) are average molecular weights, unless otherwise specified. The weight of the gel grains referred to in the examples means the dry weight of the gel grains before swelling. In the following examples the term "cross-linking agent" is meant to be synonymous with "bifunctional organic substance" used heretofore in the specification. Likewise, in the following examples, the terms "suspension medium" and "stabilized suspension medium" are meant to be synonymous with "second liquid medium" used heretofore in this specification.

Example 1

Dextran having an average molecular weight ($M_w$) of about 40,000 was moistened with about 20 percent by weight of water, and to this mixture was added a catalyzing amount of an aqueous 6 N solution of sodium hydroxide. After 1 hour a solution was formed containing no lumps. The amount of 6 N sodium hydroxide was adjusted so that the dextran concentration of the solution was about 40 percent.

600 g. of the above alkaline dextran solution were poured into a cylindrical reaction vessel provided with a stirrer and a thermometer. As a stabilized suspension medium there were added 20 g. of polyvinylacetate having an average molecular weight of about 430,000 dissolved in 500 ml. of toluene, the toluene serving as a suspension medium (continuous phase). The stirrer was put in operation and its speed adjusted so that the aqueous phase was dispersed in the form of small drops within the toluene phase. There were then added 50 g. of epichlorohydrin as a bifunctional substance or cross-linking agent. This reaction mixture was maintained under agitation at 50° C. until a substantial amount of the epichlorohydrin had reacted.

The progress of the reaction was checked by taking out samples from the reacting mixture once an hour, the content of epichlorohydrin being estimated in the samples after separating off the gel grains suspended therein. Gel formation began to take place within a reaction period of less than 1 hour.

After completion of the reaction the suspension medium was separated from the gel grains by filtration, and the suspension stabilizer was washed off of the gel grains with toluene. After washing with alcohol to remove the toluene and then with water to achieve a neutral condition, the copolymerizate obtained was dried at 110° C. The yield of copolymerizate, calculated on the basis of the dextran, was substantially quantitative.

The gel grains of the said copolymerizate were sieved to estimate their sizes, and the water regain was also determined. The results were as follows.

Distribution of size:
    50% _____ 30–50 mesh.
    36% _____ 40–100 mesh.
Water regain _____ 3.0 g./g. of the dry substance.

Example 2

In a manner similar to that set forth in Example 1, there was formed an aqueous 40 percent solution of dextran having an average molecular weight of about 40,000.

480 g. of this solution were poured into a cylindrical reaction vessel and to the solution were added 84 ml. of epichlorohydrin as a cross-linking agent and 30 g. of the polyvinylacetate set forth in Example 1 as a suspension stabilizing agent dissolved in 500 ml. of o-dichlorobenzene as a suspending medium, whereupon the reaction was caused to proceed at 50° C. resulting in a nearly quantitative yield of a copolymerizate of dextran with epichlorohydrin.

The gel grains of the copolymerizate were sieved to estimate their sizes, and the water regain was determined. The results were as follows.

Size distribution:
    22% _____ 30–50 mesh.
    53% _____ 50–100 mesh.
Water regain _____ 2.2 g./g. of dry substance.

Example 3

In a manner similar to that set forth in Example 1 there was formed an aqueous 40 percent solution of dextran having an average molecular weight of about 40,000. 480 g. of this solution were poured into the cylindrical reaction vessel set forth in Example 1, and to the solution were added 70 ml. of epichlorohydrin as a cross-linking agent and 20 g. of polyvinylacetate of the same kind as set forth in Example 1 as a suspension stabilizing agent dissolved in 500 ml. of dichloromethane. The cross-linking reaction was caused to proceed at 50° C. resulting in a nearly quantitative yield of a copolymerizate of dextran with epichlorohydrin having a water regain amounting to 2.8 g./g. of the dry substance. The size distribution of gel grains was 85% passing through the 50 mesh sieve.

Example 4

In a manner similar to that set forth in Example 1, there was formed an aqueous 40 percent solution of dextran having an average molecular weight of about 40,000. 480 g. of this solution were placed in a cylindrical reaction vessel, and to the solution were added 70 ml. of epichlorohydrin as a cross-linking agent and 20 g. of polyvinylacetate of the same kind as set forth in Example 1 as a suspension stabilizing agent, both dissolved in 500 ml. of 1,2-dibromomethane as a suspension medium. The cross-linking reaction was caused to proceed at 50° C. resulting in a nearly quantitative yield of copolymerizate of dextran with epichlorohydrin having a water regain amounting to 3.2 g./g. of the dry substance.

Example 5

In a manner similar to that set forth in Example 1, there was formed an aqueous 40 percent solution of dextran having an average molecular weight of about 40,000. 240 g. of this solution were poured into a cylindrical reaction vessel and to the solution were added 35 ml. of epichlorohydrin as a cross-linking agent and 2.5 g. of polyvinylacetate of the same kind as set forth in Example 1 as a suspension stabilizing agent, both dissolved in 500 ml. of 1,2-dichloroethane as a suspension medium. The cross-linking reaction was caused to proceed at 50° C. resulting in a nearly quantitative yield of a copolymerizate of dextran with epichlorohydrin having a water regain amounting to 2.5 g./g. of the dry product. The size distribution of gel grains was:

Mesh
    56% _____ 30–50
    20% _____ 50–100

Example 6

There was formed a solution of dextran having an average molecular weight ($M_w$) of about 40,000 by dissolving 120 g. of dextran in 800 ml. of water and adding 60 ml. of an aqueous 5 N solution of sodium hydroxide thereto. The solution of dextran was thus about 14 percent (weight/volume).

A stabilized suspension medium comprising 15 g. of celluloseacetate-butyrate as a stabilizing agent in 500 ml. of ethylenedichloride as a suspension medium was then prepared. This suspension medium was poured into a 2 liter wide-necked spherical reaction vessel provided with a stirrer and a thermometer. The temperature of the solution was adjusted to about 50° C. and the agitation speed to 200 revolutions per minute. The solution of dextran was then added in successive increments to said stabilized suspension medium. About one hour after the addition of the whole amount of the solution of dextran uniform drops were formed which were verified by examining samples taken out. There were next added 10 ml. of epichlorohydrin and the reaction was caused to proceed at 50° C. over-night. Gel formation took place after 2 hours.

In the morning of the following day the reaction was interrupted, and acetone was added to the reaction mixture. After decanting off the stabilized suspension medium from the gel grains another portion of acetone was added and decanted off to remove substantially the entire amount of the celluloseacetate-butyrate. In order to remove the film of stabilizing agent surrounding the gel grains the gel grains were dispersed in a solution of 50:50 aqueous 2 N solution of sodium hydroxide and 95 percent ethylalcohol. After treating the gel grains for 15 minutes therewith, there was added a diluted solution of hydrochloric acid to neutralize the gel grains, whereupon the mixture was filtered. The gel grains were shrunk by treating them with ethyl alcohol and finally dried at 70° C. under vacuum.

The copolymerizate contained about 10% of acetone. The yield of copolymerizate, calculated on material free from acetone, was 90 g. The water regain was 19.2 g./g. of the dry product and the swelling factor 38 m.1/g. of the dry product. The distribution of size was:

6.2% _____ 100–200 mesh.
    51.5% _____ 200–270 mesh.
    40.2% _____ 270–400 mesh.
    2.1% _____ Less than 400 mesh.

Example 7

100 g. of dextrin, produced by hydrolyzing starch under acid conditions, were dissolved in a solution of 200 ml. of water and 125 ml. of an aqueous 5 N solution of sodium hydroxide, and the solution so formed was dispersed in a stabilized suspension medium comprising 15 g. of celluloseacetate-butyrate (as stabilizing agent) in 500 ml. of ethylene dichloride (as suspension medium) at 50° C. 40 ml. of epichlorohydrin as a cross-linking agent were added to the dispersion, and the cross-linking reaction was caused to proceed at 50° C. for about 18 hours. After purification and drying as set forth in Example 6, there were obtained 100 g. of a product having a water regain amounting to 4.8 g/g. of the dry product. The size distribution was:

| | |
|---|---|
| 24% | 100–200 mesh. |
| 66% | 200–400 mesh. |
| 10% | Less than 400 mesh. |

*Example 8*

120 g. of dextran having an average molecular weight of about 20,000 were moistened with 80 ml. of water and to this were added 95 ml. of an aqueous 5 N solution of sodium hydroxide to form an aqueous alkaline solution of dextran. The alkaline solution was dispersed in a stabilized suspension medium comprising 10 g. of cellulose-acetate-butyrate and 250 ml. of ethylene-dichloride. The dispersion was heated to 50° C., and to it were added at this temperature 80 g. of ethylene glycol-diglycidether as cross-linking agent, whereafter the mixture was allowed to react for 18 hours.

After working up the gel grains and drying as set forth in Example 6, there was obtained 157 g. of a copolymerizate having a water regain amounting to 2.1 g./g. of the dry product. The distribution size was:

| | |
|---|---|
| 15 g. | 30–50 mesh. |
| 102 g. | 500–100 mesh. |
| 31 g. | 100–200 mesh. |
| 6 g. | Less than 200 mesh. |

*Example 9*

120 g. of 2-hydroxypropyldextran ($M_w=5.10^5$) were dissolved in 200 ml. of water, and to this solution were added 60 ml. of an aqueous 5 N solution of sodium hydroxide. The solution so formed was dispersed in a stabilized suspension medium of 10 g. of celluloseacetate-butyrate in 250 ml. of ethylenedichloride at a temperature of 50° C. 10 ml. of epichlorohydrin were added, and the reaction was caused to proceed at this temperature for 18 hours.

After working up the reaction mixture and drying the reaction product as set forth in Example 6, there were obtained 102 g. of a copolymerizate having a water regain amounting to 7.3 g./g. of the dry product. The distribution of size was:

| | |
|---|---|
| 5 g. | 50–100 mesh. |
| 60 g. | 100–200 mesh. |
| 36 g. | Less than 200 mesh. |

*Example 10*

60 g. of ethyl hydroxyethylcellulose were dissolved in 350 ml. of water, and to this solution were added 30 ml. of an aqueous 5 N. solution of sodium hydroxide. The solution so formed was dispersed in a stabilized suspension medium comprising 10 g. of celluloseacetate-butyrate in 250 ml. of ethylenedichloride, whereafter 10 ml. of epichlorohydrin were added as a cross-linking agent. The suspension was heated to 50° C. and maintained at this temperature for 18 hours, whereupon the reaction mixture was worked up and the gel grains dried. There were obtained 43 g. of a copolymerizate having a water regain amounting to 7.1 g./g. of the dry product. The distribution of size was:

| | |
|---|---|
| 8 g. | 100–200 mesh. |
| 27 g. | 200–400 mesh. |
| 5 g. | Less than 400 mesh. |

*Example 11*

50 g. of spray-dried dextran ($M_w=40,000$) were dissolved in 50 ml. of water, and to this solution were added 4 ml. of an aqueous 2 N solution of sodium hydroxide. The alkaline solution of dextran was then dispersed in a stabilized suspension medium comprising 3 g. of cellulose-acetate-butyrate in 100 ml. of ethylene-dichloride. To this dispersion were then added to 10 ml. 1,2,3,4-diepoxybutane as a cross-linking agent and the mixture was heated to 50° C., whereupon the reaction was permitted to proceed overnight. The completed reaction mixture was worked up and the gel grains were dried as set forth in Example 1. There were obtained 50 g. of a copolymerizate having a water regain amounting to 5.0 g./g. of the dry product.

*Example 12*

100 g. of starch washed with water were dissolved in 280 ml. of water and 240 ml. of an aqueous 5 N solution of sodium hydroxide. This alkaline solution was dispersed in a stabilized suspension medium comprising 15 g. of celluloseacetate-butyrate in 500 ml. of ethylenedichloride. After stirring the dispersion for an hour in order to stabilize the drops of starch solution in the dispersing medium there were added 70 g. of 1,3-dichloropropane-2-ol as cross-linking agent. The reaction was caused to proceed for 10 hours at 50° C. After working up the reaction mixture as set forth in Example 6, there were obtained 93 g. of a copolymerizate in gel grain form characterized by a water regain of 3.3 g./g. of the dry product.

*Example 13*

20 g. of polyvinylalcohol were dissolved in 140 ml. of water and 60 ml. of an aqueous 5 N solution of sodium hydroxide. The alkaline solution obtained was dispersed in a stabilized suspension medium of 8 g. celluloseacetate-butyrate in 200 ml. of ethylenedichloride. To the dispersion obtained were added 20 ml. of epichlorohydrin and the reaction was caused to proceed for 16 hours at 50° C. and then for 4 hours at 70° C. After working up the reaction mixture according to the procedure set forth in Example 6, there was obtained a copolymerizate having a water regain of 9.1 g./g. of the dry product. The distribution of size was:

| | |
|---|---|
| 60% | 20–50 mesh. |
| 30% | 50–100 mesh. |
| 10% | Less than 100 mesh. |

*Example 14*

120 g. of dextran ($M_w=40,000$) were moistened with 36 ml. of water, whereafter the moistened dextran was dissolved in 144 ml. of an aqueous 3 N solution of sodium hydroxide. The alkaline solution of dextran was then dispersed in a stabilized suspension medium consisting of 300 ml. of ethylenedichloride (as suspending medium) and 30 g. of a 27 percent solution of polymethylmethacrylate in ethylacetate (as stabilizing agent). After a stabilizing period of 30 minutes there were added 30 ml. of epichlorohydrin, and the reaction was caused to proceed for 10 hours at 50° C. The gel grains obtained were separated by filtration, rinsed first with ethylenedichloride and then with 99.5 percent ethylalcohol after which they were dispersed three times in water, decantation being carried out between the dispersing operations. The gel grains were finally shrunk with 99.5 percent alcohol. After dying at 60° C. the product weighted 120 g. and showed a water regain of 6.2 g./g. of the dry product.

*Example 15*

120 g. of dextran ($M_w=20,000$) were moistened with 30 ml. of water, and the moistened dextran was dissolved in 120 ml. of a aqueous 5 N solution of sodium hydroxide. The alkaline dextran solution was dispersed in a stabilized suspension medium comprising 6 g. of polyvinylbutyral ($M_w=70,000$) in 300 ml. of ethylenedichloride. 40 ml. of epichlorohydrin were then added, and the reaction was caused to proceed at 50° C. for 16 hours. The gel grains were filtered off and dispersed 4 times in 500 ml. acetone, decantation being carried out between the dispersion operations. Any remaining polyvinylbutyral was rinsed away by dispersing the grains in aqueous 1 N hydrochloric acid for 10 minutes. Finally the copolymerizate was washed with water, shrunk with 99.5 percent alcohol and dried. The product obtained weighed 110 g. and was characterized by a water regain of 2.5 g./g. of the dry product.

MISCELLANEOUS

Those skilled in the chemical arts and particularly in the art to which this invention pertains will readily appreciate that many modifications of the basic invention set forth here are possible.

What is claimed is:

1. A method of the manufacture of high molecular weight hydrophilic copolymerizates in the form of gel grains which comprises:
   (a) providing a first liquid solution of a hydroxyl group-containing uncharged polymer substance, said first liquid solution containing water as the main liquid component, and said polymer substance being selected from the group consisting of dextran, starch, dextrin, cellulose, polyglucose, methyl dextran, ethyl, dextran, hydroxyl-propyl dextran, methyl cellulose, ethyl cellulose, ethylhydroxyethyl cellulose, polyvinyl alcohol ethyl ether of dextran, hydroxyethyl ether of dextran, 2-hydroxypropyl ether of dextran, dextran glycerine glucoside, hydrodextran and polyvinyl alcohol,
   (b) reacting with said hydroxyl polymer substance a bifunctional organic substance capable of reacting with the hydroxy groups of the uncharged polymer substance with the formation of ether bridges, said bifunctional organic substance being selected from the group consisting of epichlorohydrin, dichlorohydrin, 1,2,3,4-diepoxybutane, bis-epoxy propyl ether, ethylene glycol-bis-epoxy propyl ether and 1,4-butan-diol-bis-epoxypropyl ether,
   (c) said reaction being carried out in the presence of an alkaline reacting substance,
   (d) said first liquid solution of said hydroxyl polymer substance being admixed, prior to said reaction, with a second liquid medium comprising an organic compound that its immiscible with water so that a two-phase system is formed, said second liquid medium constituting the continuous phase,
   (e) agitating said first liquid solution of said hydroxyl polymer substance and said second liquid medium sufficiently to cause the formation of drops containing said hydroxyl polymer substance within the continuous phase provided by said second liquid medium,
   (f) said drops being maintained at least until gel formation has taken place as the result of the reaction of said hydroxyl polymer with said bifunctional organic substance in the presence of said alkaline reacting substance, and
   (g) recovering the gel grains of the copolymerizates formed from said reaction.

2. A method according to claim 1, in which the alkaline substance is contained in said first liquid solution of the uncharged polymer substance.

3. A method as set forth in claim 1 in which the said bifunctional organic substance is contacted with said first solution of the uncharged polymer substance after the formation of said two-phase system.

4. A method as set forth in claim 1 in which the whole amount of said bifunctional organic substance is contacted with said uncharged polymer substance without permitting gel formation to take place before forming the two-phase system.

5. A method as set forth in claim 1 in which a portion of the said bifunctional organic substance is contacted with said uncharged polymer substance before forming the two-phase system without gel formation being permitted to take place and the remaining portion of said bifunctional organic substance is supplied to the two-phase system.

6. A method as set forth in claim 1 in which at least a portion of said bifunctional organic substance is dissolved in said second liquid medium.

7. A method as set forth in claim 1 in which said first solution of the uncharged polymer substance, the alkaline reacting substance and said bifunctional organic substance are admixed and maintained at a sufficiently low temperature to prevent gel formation and the two-phase system is thereafter formed.

8. A method according to claim 1 wherein said first liquid is water and second liquid solution is selected from the group consisting of toluene, dichloromethane, 1,2-dichloroethane, 1,2-dibromoethane, o-dichlorobenzene and ethylenedichloride.

9. A method as set forth in claim 8 in which the degree of dispersion of the two-phase system is controlled by adding to the second liquid medium a high molecular weight substance that is immiscible with water.

10. A method as set forth in claim 9, in which the content of said high molecular weight substance is in the range of from 0.1 to 15 percent, based on the amount of said second liquid medium.

11. A method according to claim 10 wherein said high molecular weight substance is selected from the group consisting of polyvinyl acetate, polystyrene, polyisobutylene and celluloseacetate-butyrate.

12. A method according to claim 1 wherein said polymer substance is dextran and said bifunctional organic substance is epichlorohydrin.

13. A molecular sieving agent of beaded particles comprising: a copolymerizate of a polymer selected from the group consisting of dextran, starch, dextrin, cellulose, polyglucose, methyl dextran, ethyl dextran, hydroxylpropyl dextran, methyl cellulose, ethyl cellulose, ethyl hydroxyethyl cellulose, ethyl ether of dextran, hydroxy ethyl ether of dextran, 2-hydroxy propyl ether of dextran, dextran glycerine glucoside, hydrodextran and polyvinyl alcohol with a bi-functional organic substance selected from the group consisting of a epichlorohydrin, dichlorohydrin, 1,2,3,4-diepoxybutane, bis-epoxy propyl ether, ethylene glycol-bis-epoxy propyl ether and 1,4-butan-diol-bis-epoxy propyl ether, said copolymerizate having a water regain in the range of from 1 to 50 grams per gram of the dry substance.

References Cited by the Examiner

UNITED STATES PATENTS

| | | | |
|---|---|---|---|
| 3,042,667 | 7/62 | Flodin et al. | 260—209 |
| 3,105,012 | 9/63 | Brandon et al. | 206—209 |

FOREIGN PATENTS 854,715  11/60  Great Britain.

OTHER REFERENCES

Schildknecht: High Polymers, volume V, chapter III, Polymerizations in Suspension.

LEWIS GOTTS, *Primary Examiner.*

CHARLES B. PARKER, *Examiner.*